Nov. 25, 1947.  E. J. W. RAGSDALE ET AL  2,431,661
SEATING ARRANGEMENT AND CONSTRUCTION
Filed Nov. 8, 1943  2 Sheets-Sheet 1
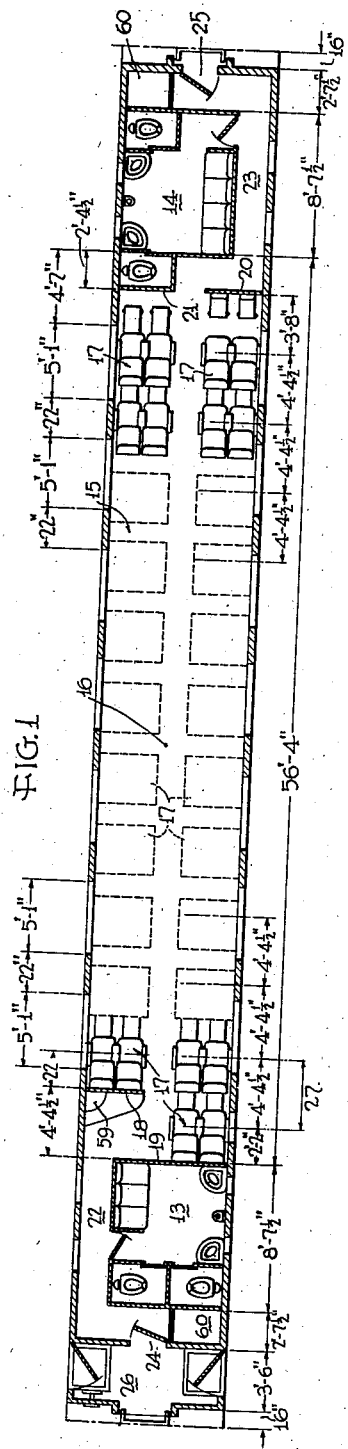
INVENTORS
Earl J.W. Ragsdale
Joseph Ledwinka.
BY John P. Tarbot
ATTORNEY Nov. 25, 1947.     E. J. W. RAGSDALE ET AL     2,431,661
SEATING ARRANGEMENT AND CONSTRUCTION
Filed Nov. 8, 1943     2 Sheets-Sheet 2
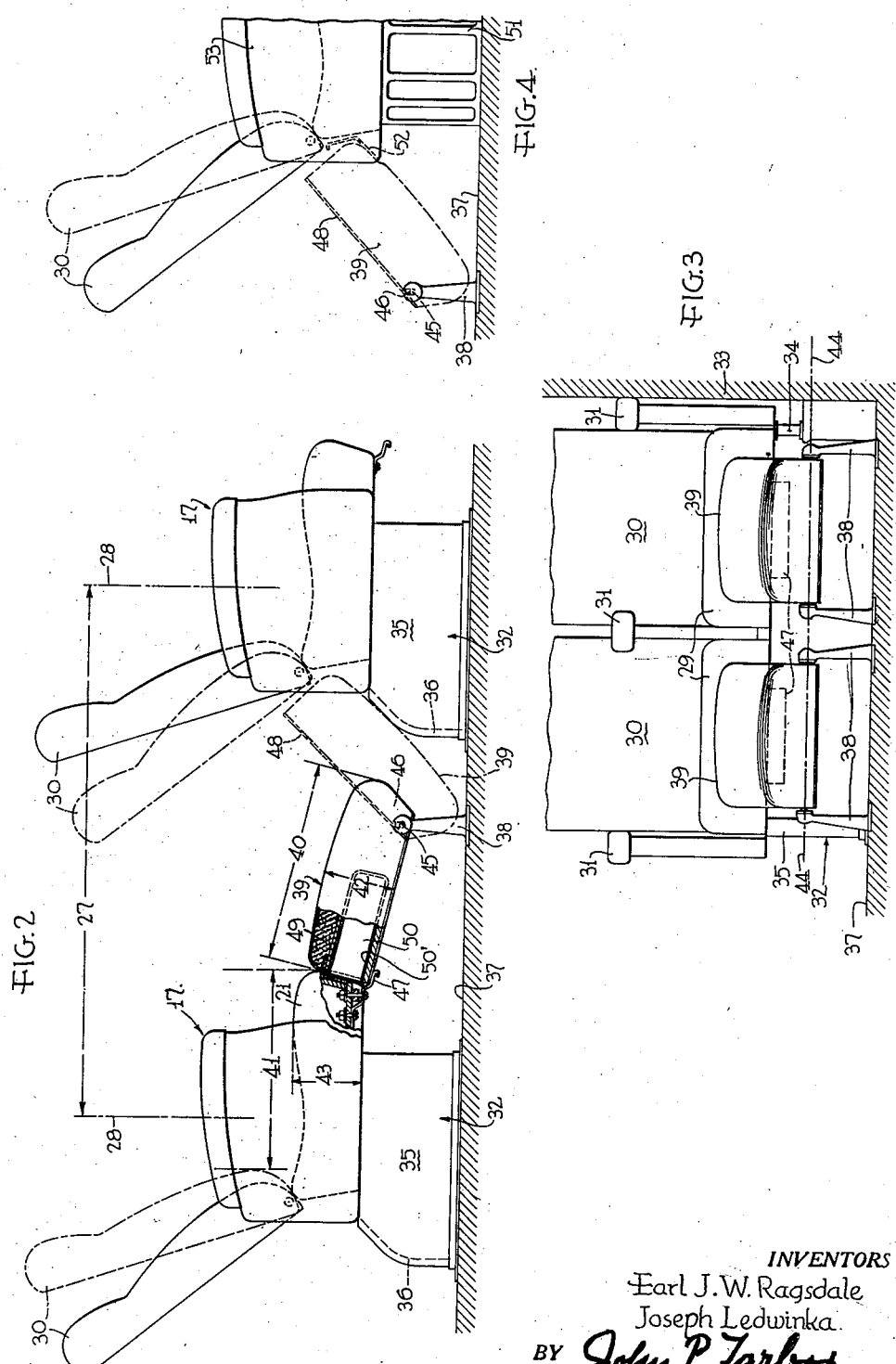
INVENTORS
Earl J. W. Ragsdale
Joseph Ledwinka
BY John P. Tarbox
ATTORNEY Patented Nov. 25, 1947

2,431,661

UNITED STATES PATENT OFFICE 2,431,661

SEATING ARRANGEMENT AND CONSTRUCTION

Earl J. W. Ragsdale, Norristown, and Joseph Ledwinka, Philadelphia, Pa., assignors to The Budd Company, Philadelphia, Pa., a corporation of Pennsylvania Application November 8, 1943, Serial No. 509,380

5 Claims. (Cl. 155—8)

The invention refers to a seating arrangement and seat construction which is outstandingly designed for rail cars or other vehicles where the seats are arranged in rows and permanently secured to the floor.

An object of the invention is a new seat arrangement and construction which offers additional comforts to the passengers of trains, especially by allowing sleeping or resting in semi-lying position, but which does not require an excessive amount of additional space and is of simple, rugged and durable construction.

The objects of the invention are outstandingly achieved by a seat construction and arrangement comprising a row of chairs, preferably of the reclining type, and supplementary cushions or the like which are journalled at some distance in front of the respective seat to a structure supported by the floor in such a manner that they may be swung against the seat cushion so as to provide an extension thereof or away from the seat cushion into a position where their underside faces toward the seat and forms a foot rest.

The foregoing outline of the invention, its objects and advantages is by no means complete, so that for more detailed information reference is had to the embodiments disclosed in the attached drawing and to the following description thereof.

In the drawing:

Figure 1 is a diagrammatic plan view of a rail car provided with seats according to the invention;

Figure 2 is a side elevation of two seats and of the extension cushion for one of them, the extension being shown in one position in full lines and partly in section and in the other position in dot-and-dash lines;

Figure 3 is a fragmentary front elevation of a pair of seats and their extensions as shown in Figure 2;

Figure 4 is a fragmentary side elevation of one seat and of the seat extension of an adjoining seat, yet of a form which is slightly different from the form shown in Figures 2 and 3; and Figures 5 and 6 are views similar to the views shown in Figures 2 and 3, yet of a still further modification.

The rail car body illustrated in Figure 1 has rest rooms 13, 14 at its ends. The passenger compartment 15 between the rest rooms shows the customary center aisle 16 between two rows of double seats 17. One end of the passenger compartment is formed by a partition wall 18 and the longitudinally offset wall 19 of the rest room 13. The other end of the passenger compartment is formed by the partition wall 20 and the coplanar wall 21 of the rest room 14. The aisles 22, 23 connecting the end doors 24, 25 with the passenger compartment and the arrangement and equipment of the rest rooms are clearly shown in the drawing and do not require detailed description. It will be noted that the illustrated car has a vestibule 26 at one end only, and two cars of corresponding design may be connected to each other by their ends without vestibule.

The distance 27 between successive transverse middle lines 28 of the seats 17, some of which are indicated by dotted lines only in Figure 1, is substantially greater than customary for cars with reclining seats, which cars are now quite popular under the name "sleeper coaches." The spacing 27 is in the illustrated embodiment about 52½ inches.

The construction of each seat or pair of seats 17, with its seat cushion 29, its swingable back rest 30 and its arm rests 31 may be of substantially conventional design in all illustrated embodiments.

In the embodiment illustrated in Figures 2 and 3, the double seat 17 is supported by a structure 32 and on the side of the outer wall 33 by a bracket 34. The structure 32 comprises a longitudinally extending wall 35 along the aisle and a back wall 36 which extends from the wall 35 to about the outer body wall 33 and is attached to the floor 37. The structure 32 offers beneath the seat cushions 29 luggage space for the seat occupants and its rear wall 36 serves for an additional purpose which will become apparent later on.

At about two-thirds of the distance between two double seats are secured pairs of brackets 38 to the floor 37, one pair of brackets for each individual seat. A cushion 39 of similar length 40 and of similar thickness 41 as the effective length 42 and thickness 43, respectively, of the seat cushion 29, but of less width, is journalled rotatably about a transverse horizontal axis 44 to the upper ends of a pair of brackets 38 in front of each individual seat 17. The cushion 39 is provided for this purpose near one of its lower transverse margins with two pins or studs 45 which fit into upwardly open slots 46 of the brackets 38. The pin and slot connection provides for easy removal of the cushions 39 which is helpful in case of repair and floor cleaning.

Attached to the underside of the seat cushion 29 is a forwardly extending bracket 47 which serves as a support for the opposite lower transverse edge of the cushion 39 when the latter is in the position shown in full lines in Figure 2. In this position the cushion 39 forms an extension for the seat cushion 29 so as to form a comfortable support for the legs of the occupant allowing him to rest in semi-lying position when the back rest 30 is simultaneously in its lowered or reclining position.

This provision for supporting the legs and feet of the travelers at about the same level with the seat cushion greatly contributes to comfortable and refreshing rest and sleep.

The distance between the cushions or seat extension 39, which may be termed an ottoman, and the following seat is such that it permits a person to reach the outside seat if the ottoman of seat at the aisle 16 should be in the rest position illustrated on the left side of Figure 2. It also permits the occupant to stand in front of his seat with lowered ottoman for arranging blankets, etc., prior to occupying the seat.

The ottoman 39 may be swung from the position shown in full lines in Figure 2 about the axis 44 into the position shown in dot-and-dash lines in the same figure where it rests against the back wall 36 of the next seat in front. The upper part of the back wall 36 is inclined for this purpose and a recess is left free under the back rest and behind the seat cushion 29 of the next seat so as to accommodate the upper corner of the ottoman 39 as clearly shown in Figure 2. When the seat is swung upwardly and forwardly into the dot-and-dash position, its lower edge is kept slightly above the ground so that it will not get soiled. Moreover, it leaves in this position ample space for the seat occupants to stand in and step into the space between the brackets 38 and the seat or to rest their feet on the floor 37 in the space while sitting. The upturned underside 48 of the ottoman 39 presents itself as inclined foot rest.

The upper side of the ottoman 39 is softly upholstered as indicated at 49. A receptacle or compartment 50 is formed in the ottoman and serves for handbags or other small articles. This compartment is closed by the front side of the seat cushion 29 when the ottoman is in its substantially horizontal position but becomes accessible by turning the ottoman upwardly. The compartment becomes also closed by the rear of the seat ahead. The compartment or recess is lined with a bag 51' attached at the opening whereas the remainder is loose; this permits emptying of dirt or small articles by the simple process of turning the bag inside out. The compartment arrangement in the ottoman forms the subject matter of the simultaneously filed application of George Trautvetter for "Vehicle seat."

The seat shown in Figure 4 differs from the structure illustrated in Figures 2, 3 only in the use of an open support 51 for the seat cushion along the aisle side so that the room underneath the seat is accessible from both front and rear and can easily be cleaned. The ottoman 39 is supported in the upturned position by a bracket or shelf 52 attached to the side members and arm rest supports 53.

The embodiment illustrated in Figures 5 and 6 differs from the embodiment shown in Figures 2 and 3 only in the means for swingably supporting the ottoman or extension cushion 39. In this embodiment, pairs of brackets 54 are attached to the floor 37 in front of the seats. A transversely extending rod 55 is journalled in each pair of brackets 54 and has secured to its ends arms 56. The other ends of the arms 56 are journalled at 57 to the ottoman 39. The bracket 47' on the seat cushion 29 is engaged by member 57 on the adjoining edge of the ottoman 39 so as to prevent the ottoman from slipping off.

The last seats 17 at the right end of Figure 1 have their extensions or ottomans 39 in the upturned position resting against the walls 20 or 21 instead of against a seat in front of them.

The typical, outstanding dimensions indicated in Figure 1 show that a car of standard length can accommodate 46 passengers in the new comfortable way, and that most of the seats are so arranged that the view is not, or only little, impeded by the pillars 58 between the windows. In addition, there is ample space for the rest rooms 13, 14, the water cooler 59 and closets 60.

The invention is liable to many modifications of its basic idea in addition to the modifications and embodiments shown and described in detail. All such modifications are intended to be covered by the attached claims.

What is claimed is:

1. In a seating arrangement, a seat comprising a base supported by the floor, a seat cushion supported by said base, a second one-piece unitary cushion, elongated means extending a substantial distance above the floor and supported independently of and at a distance in front of said base, which means are adapted for supporting said second cushion swingably about a transverse axis into two positions, means for holding said second cushion relative to said seat cushion so that as a one-piece unit it is arranged in one of its two positions in proximity and extension of said seat cushion and thereby presents a rest for the lower part of the legs of a person sitting on said seat cushion, and means for holding said second cushion in the other position so that its underside is inclined, faces upwardly towards the seat and is arranged at a distance from the seat cushion so that it presents a foot rest.

2. A seat comprising a floor support, a seat cushion on said support, a one-piece ottoman cushion, a pair of elongated columnar supporting brackets arranged at a distance in front of said seat cushion, transversely spaced from each other, rigidly secured to the floor and supporting at their upper ends between them said ottoman cushion swingably about a transverse axis arranged horizontally a considerable distance above floor level, means adapted for supporting said ottoman cushion in collaboration with said brackets so that the upper side of the ottoman cushion is in extension of the seating surface of said seat cushion; and means adapted for supporting said ottoman cushion in a generally upright position so that it is spaced from the seat and leaves an entry aisle between it and the seat.

3. A seat comprising a floor support, a seat cushion on said support, a one-piece ottoman cushion, a pair of supporting links arranged at a distance in front of said seat cushion and transversely spaced from each other, means supported by the floor for attaching said links near one of their ends transversely spaced from one another and close to the floor swingably about a horizontal transverse axis, further means for attaching the other ends of said links to said ottoman cushion swingably between said links about an axis parallel to said first-named axis, means adapted for supporting said ottoman cushion in collaboration with said links so that the upper side of the ottoman cushion is in extension of the seating surface of said seat cushion; and means adapted for supporting said ottoman cushion in a generally upright position in front of and spaced from the seat leaving an entry aisle between it and the seat.

4. A seat comprising a floor support, a seat cushion on said support, supporting means carried by and extending a substantial distance above the floor and arranged at a distance in front of said seat cushion, which distance is near to the customary width of the aisles between successive seats of railway coaches, a one-piece ottoman cushion pivotally mounted on said supporting means swingably about a horizontal transverse axis and foldable into two positions, said axis being arranged at a distance above floor level close to the distance between floor level and said seat cushion, further means adapted for supporting said ottoman cushion in collaboration with said said supporting means in one of said two positions so that the upper side of the ottoman cushion is in proximity and in extension of the seating surface of said seat cushion; and means adapted for supporting said ottoman cushion in said second position, in which position it is generally upright and is spaced from the seat and leaves an entry aisle between it and the seat.

5. In a seating arrangement having a floor, a seat with a seat cushion supported by the floor, and a one-piece leg rest, a pair of transversely spaced elongated members journalled about a transverse horizontal axis near one of their ends to the lateral sides of said leg rest at substantial distance above the floor and provided at their other ends with means securing them to the floor at a distance in front of said seat so that the leg rest is swingably supported between said members, and holding means adapted for supporting said leg rest in coaction with said members in one position in which its one side faces upwardly and is in extension of the seat cushion thereby serving as leg rest and in another position in which the leg rest is spaced from the seat and leaves stepping room between it and the seat.

EARL J. W. RAGSDALE.
JOSEPH LEDWINKA.

REFERENCES CITED

The following references are of record in the file of this patent:

UNITED STATES PATENTS

| Number | Name | Date |
|---|---|---|
| 26,571 | Danner | Dec. 27, 1859 |
| 837,050 | Garnett | Nov. 27, 1906 |
| 89,976 | Diack | May 11, 1869 |

FOREIGN PATENTS

| Number | Country | Date |
|---|---|---|
| 375,022 | Great Britain | June 23, 1932 |